Jan. 23, 1923.

E. BELIN,
TRANSMISSION APPARATUS.
FILED JULY 31, 1913.

Witnesses
L. Compton
G.W. Kirkley

Inventor
Edouard Belin
By Robb & Robb
Attorneys

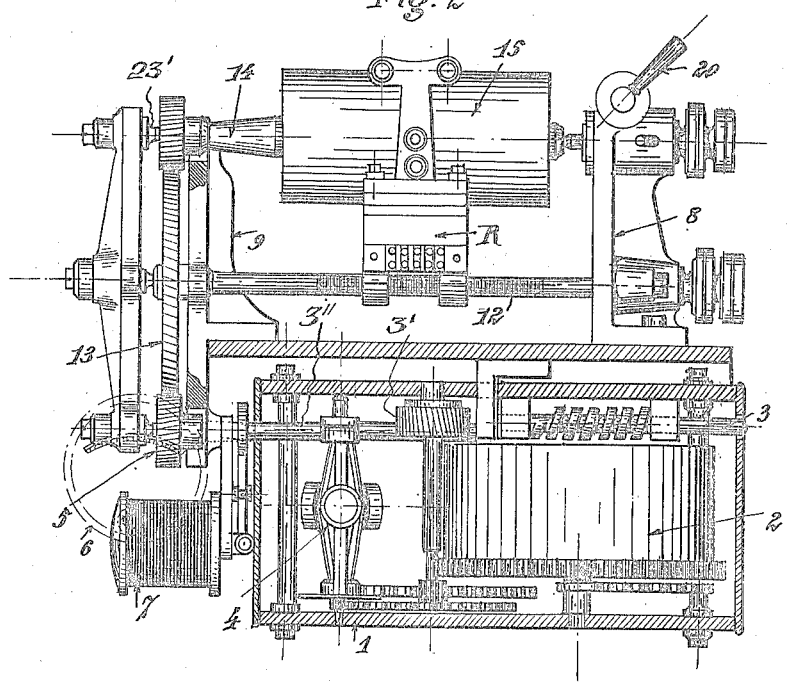
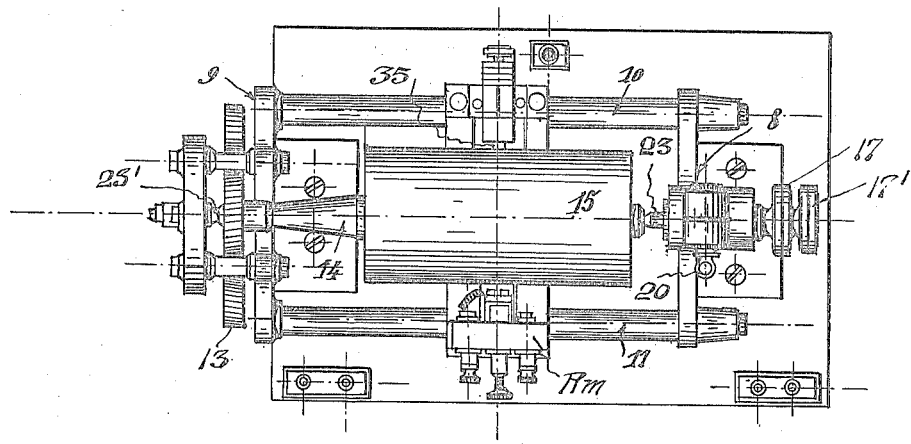

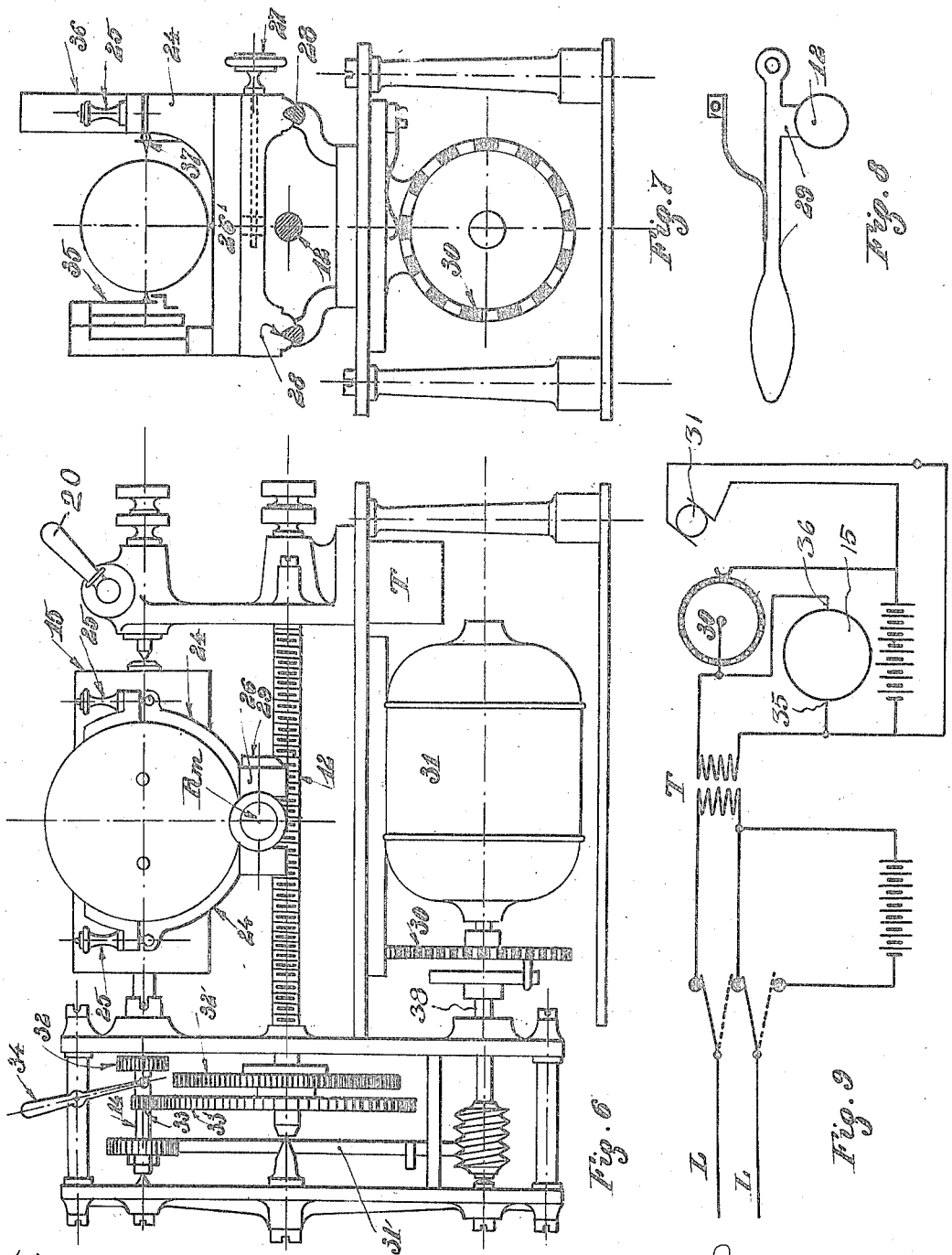

Patented Jan. 23, 1923.

1,443,066

UNITED STATES PATENT OFFICE.

EDOUARD BELIN, OF PARIS, FRANCE.

TRANSMISSION APPARATUS.

Application filed July 31, 1913. Serial No. 782,347.

*To all whom it may concern:*

Be it known that I, EDOUARD BELIN, a citizen of the Republic of France, residing at 31 Boulevard Luchet, Paris, France, have invented certain new and useful Transmission Apparatus, of which the following is a specification.

In the specification of Patent No. 915154 is described a system of transmitting to a distance all kinds of graphic documents, this system being based on the employment at the transmitting station of an original presenting a surface in relief and an apparatus which permits of utilizing this relief for the variation (continuous, graduated, or irregular) of the line current received in an optical system.

The apparatus which forms the object of the present application is designed for the purpose of obtaining with minimum size and weight a complete transmitting station capable of being connected with the line at the end of which the receiver is arranged.

Reference will now be had to the accompanying drawings forming a part of this specification wherein:

Figure 2 is a front elevation thereof.

Figure 4 is a top plan view.

Figure 6 is a front elevation of a device constituting a modification of the construction heretofore referred to and embodying electric driving mechanism.

Figure 7 is a sectional view through the apparatus shown in Figure 6.

Figure 8 is a detail view of the operative or driving connection between the movable carriage and the drive shaft.

Figure 9 is a diagrammatic view of the electrical connections for the apparatus.

Figure 1:
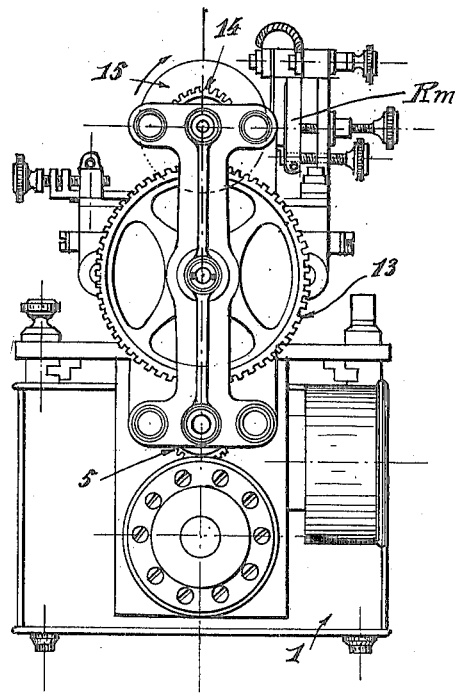
Figure 1 is an end elevation of an apparatus constructed in accordance with this invention.
Figure 3:
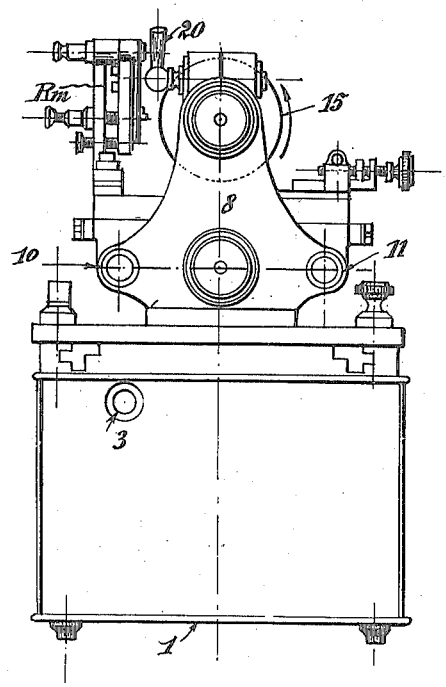
Figure 3 is an elevation of the end of the apparatus opposite to that shown in Figure 1.

*The motor group.*—In a box or container 1 is disposed a powerful spring contained in a barrel 2, capable of being wound from the exterior by the application of a key (not shown) to the stem 3, and this actuates, through a suitable train of multiplying gearing, a speed regulator 4, thus providing for a practically constant speed which can easily be determined from the exterior of the casing in the usual manner. In addition to this the spring drives a pinion 5 through the intermediate gearing, including the worm 3' and shaft 3''. On the box 1 may be fixed a suitable resistance 7 when a rheostat is employed or a combined rheostat and microphone of the type hereinafter mentioned.

Figure 5:
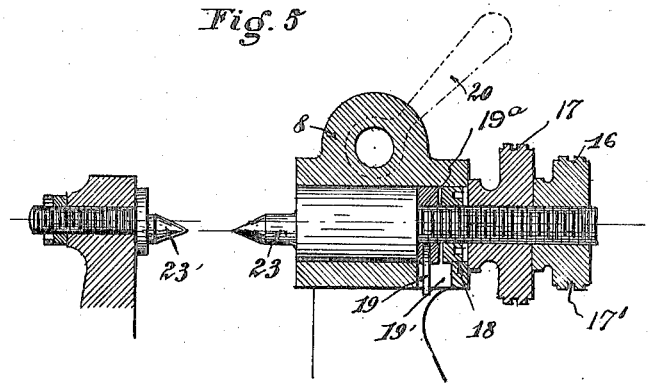
Figure 5 is a detail sectional view showing more clearly the supporting means for the cylinder carrying the relief.

*The transmitter.*—The transmitter comprises a structure embodying the two end standards or supports 8 and 9 fixed upon a plate and interconnected by means of spacing rods 10 and 11. A worm shaft 12 is arranged between the two standards and actuated by the pinion 5 through the intermediate gear 13. This worm, by its rotation, produces the regular longitudinal displacement of a surface exploring arrangement embodying certain points hereinafter referred to. The gear 13 also drives the upper shaft or spindle 14 which carries the cylinder 15 containing the stereotyped block or other record to be transmitted. The worm 12 and the shaft 14 should rotate in such a manner that the movement of the exploring point in contact therewith describes on the cylinder a helix of determined pitch (one-third of a millimeter, for instance), according to the extent of the detail of the cut or relief which is to be transmitted. The synchronism of the rotating cylinder is maintained by any suitable arrangement. In order to insure perfect parallelism between the two axes 12 and 14, the latter is carried at its two ends by the eccentric points 23, 23' (Fig. 5). The point 23 is a relatively fixed point once the proper adjustment or positioning of the same in its supporting standard has been set. But the point 23 is capable of such adjustment as to bring the cylinder into proper alignment with the shaft 12 that proper contact of the transcribing points will be maintained throughout the movement of said points over the surface. The end of the spindle of the cylinder may be raised and lowered by properly adjusting the point 23 which is accomplished by its rotation, the point being free to rotate when the clamp 20 is released to permit of this rotative action. The threaded end 16 of the device 23 carries a nut 19ª which is held against rotation in the standard support by means of a pin 19 projecting therefrom into a slot 19'. Against this a jam nut 18 acts to lock the nut 19ª on the threaded end 16, preventing rotative movement of the point 23 in its standard support, while permitting of longitudinal movement as desired in application of a cylinder between the two points. A nut 17 is mounted upon the threaded part 16 so that when it is desired to move the point 23 inwardly this is backed off to accomplish this purpose, after which it is screwed up against the face of the standard and fixes the point 23 fast in its mounting. A jam nut 17' is mounted on the end of the threaded portion 16 to coact with the nut 17 just referred to, to prevent accidental displacement. Once the points 23 and 23' have been thus adjusted, they are allowed to remain permanently fixed. In other words, this adjustment will be maintained although it is possible to remove the cylinder by merely releasing the handle 20 to permit of the point 23 being shifted longitudinally to accomplish the displacement.

The clockwork mechanism shown in Figure 2 may be replaced by a small electric motor, either alternating or direct. In Figure 6 is shown this modified arrangement, the figure being a front elevation. The motor 31, through multiplying gearing, actuates a vertical shaft 31' which drives the spindle 14 of the cylinder 15. In the drawing a reducing system for the worm drive 12, which is employed to drive the carriage upon which the exploring points are mounted, is shown. The pinions, 32, 32' produce a lower speed than may be obtained through the pinions 33, 33' and in this manner the exploring point acting upon the surface of the cylinder 15 will make a greater or less number of turns of the helix per unit length, and the relief surface will accordingly be more or less finally reproduced, for example, with six lines or with three lines to the millimeter. A clutch handle 34 permits the change from one speed to the other. The omission of the spring barrel and all of the parts shown in the preferred form will naturally produce a lightening of the apparatus. This is an advantage in a portable device of this character.

The carriage R which is mounted to travel longitudinally of the cylinder, and which is adjustable transversely thereof, embodies three exploration systems. Reference has been made hereinbefore of the use of a combined rheostat and microphone, and this instrument is designated by Rm in Figure 6, the form of this instrument being of a known character and specifically depicted in my prior Patent No. 1,143,487, granted June 15, 1915. This instrument is mounted upon the support or fork 24 forming a part of the base 26' and arranged at one side of the cylinder. The base 26' is slidable transversely of the cylinder upon the carriage 26 by means of the screw 27, through the instrumentality of which the point 37 of the instrument may be moved into and out of contact with the relief surface. At the opposite side of the cylinder is mounted an interrupter having the point 35 arranged to coact with the relief surface when it is desired to employ this instrument instead of the instrument Rm, so that the adjustment by the screw 27 will bring either the point 35 of the interrupter into contact with the surface or the point 37 into such contact, or an intermediate adjustment may be obtained where neither of these points will be in contact, under which last mentioned condition the carriage may be freely moved longitudinally of the cylinder. The carriage 26 is mounted upon the two side rails 28 arranged parallel with the screw 12, and a thread-engaging member or knife 29, shown most clearly in Figure 8, engages with the screw so as to produce the longitudinal displacement of the carriage in the exploring of the surfaces. Lifting the knife member the carriage will be free to slide longitudinally as above referred to.

The rapid rotation of the electric motor may be utilized for sending into the line very strong variations of current. If direct current is employed, a branch is passed through a rotary interrupter 30 which produces a large number of pulsations in the circuit. This circuit passes to the primary of a transformer, of which the secondary is arranged in the line, as shown most clearly in Figure 9. The microphone is connected in shunt with the source of current which feeds the motor.

It will be understood that there is preferably employed a friction drive between the motor and the pinion on the shaft 38, in order to avoid shocks and longitudinal vibrations of the motor.

If an alternating current motor is being employed, any well-known approved means may be utilized for interrupting the line current.

The arrangement in Figure 9 discloses the connection for supplying the line with direct current.

I claim:

1. In a portable apparatus for transmission of documents by relief, the combination of a cylinder carrying the relief surface, means for rotating the cylinder, an exploration system arranged at each side of the cylinder and shiftable longitudinally thereof, and a common means for shifting either of said exploration systems into contact with the relief surface.

2. In portable apparatus for the transmission of documents by relief, the combination of a cylinder carrying the relief surface, means for rotating the cylinder, an exploration system arranged adjacent to the cylinder and shiftable therealong, said system including a point arranged at one side of the cylinder and a second point arranged at the opposite side of said cylinder, a support for said points movable transversely of the cylinder to bring either of the same into contact with the relief surface, means for effecting the transverse displacement of the points, and means for moving said points longitudinally of the cylinder.

3. In portable apparatus for the transmission of documents by relief, the combination of a cylinder carrying the relief surface, means for rotating said cylinder, an exploration system arranged adjacent to the cylinder and operably connected to the rotating means therefor, said system including a carriage movable longitudinally of the cylinder, an interrupter at one side of the cylinder and a rheostant and microphone at the opposite side of the cylinder, a support for said interrupter and rheostat and microphone shiftable transversely of the carriage to bring the respective points of the interrupter or the rheostat and microphone into contact with the relief surface, and means for effecting said transverse adjustment.

4. In portable apparatus for the transmission of documents by relief, the combination of a cylinder carrying the relief surface, means for rotating said cylinder, an exploration system for exploring the cylinder including an interrupter and a combined rheostat and microphone, and a common means for adjusting the exploration system to produce coaction between the interrupter and the cylinder or the combined rheostat and microphone therewith.

In witness whereof I have hereunto signed my name this 18th day of July 1913, in the presence of two subscribing witnesses.

EDOUARD BELIN.

Witnesses:
ANTONNI MONTEILHET,
HANSON C. COLE.